United States Patent
Spearing

(10) Patent No.: US 6,679,615 B2
(45) Date of Patent: Jan. 20, 2004

(54) LIGHTED SIGNALING SYSTEM FOR USER OF VEHICLE

(76) Inventor: Raliegh A. Spearing, 185 W. 170$^{th}$ St., Apt. 4B, Bronx, NY (US) 10452

( * ) Notice: Subject to any disclaimer, the term of this patent is extended or adjusted under 35 U.S.C. 154(b) by 0 days.

(21) Appl. No.: 10/086,766

(22) Filed: Mar. 1, 2002

(65) Prior Publication Data

US 2002/0145864 A1 Oct. 10, 2002

Related U.S. Application Data

(60) Provisional application No. 60/282,832, filed on Apr. 10, 2001.

(51) Int. Cl.$^7$ .............................................. F21V 21/08
(52) U.S. Cl. ................... 362/103; 362/108; 362/473; 362/541; 362/540; 340/475; 340/984; 340/691.6
(58) Field of Search ................... 362/103, 108, 362/106, 473, 541, 540; 340/475, 432, 985, 984, 691.4, 691.6, 568.7, 568.3, 571

(56) References Cited

U.S. PATENT DOCUMENTS

| | | |
|---|---|---|
| 4,891,736 A | 1/1990 | Gouda |
| 5,690,411 A | 11/1997 | Jackman |
| 2002/0044052 A1 | 4/2002 | Stewart ...................... 340/475 |

*Primary Examiner*—Stephen Husar
*Assistant Examiner*—Sharon Payne

(57) ABSTRACT

A lighted signaling system connected to the electrical indicating system of a vehicle or devices on the vehicle which cause the vehicle to change direction or speed. The signaling system allows the user of the vehicle to clearly signal directional and vehicular intentions, including right turns, left turns, running and braking.

9 Claims, 3 Drawing Sheets

LIGHTED SIGNALING SYSTEM FOR USER OF VEHICLE

This application claims the benefit of U.S. Provisional Application No. 60/282,832, filed Apr. 10, 2001.

FIELD OF THE INVENTION

The invention generally concerns lighted signaling systems for users of vehicles. In particular, the invention provides an item of apparel containing a lighted signaling system for signaling vehicular indicators, including running, turning and braking indicators, which can be worn by a user to inform others of the user's directional intentions. The lighted signaling system may also display advertisements, logos, names, trade names, trademarks, emblems, signs or other symbols.

BACKGROUND OF THE INVENTION

In motor vehicle applications, it can sometimes be difficult for others to determine the signaling intentions of a user operating a vehicle. In particular, where the vehicle is a motorcycle, running, turning and braking indicators may be difficult to see because they are small and low to the ground. As traffic increases, it becomes even more imperative that other motorists are alerted to the presence and directional intentions of the cyclist so that they may avoid collisions and share the roadways safely.

Signaling devices for signaling presence and directional intention have been attached to vehicles in the prior art. Headlights, brake lights, running lights, and right and left turn signals have become standard and legally required vehicular indicators on motor vehicles.

Manual signaling means for signaling presence and directional intention have also been in use and are disclosed in the prior art. Equipment and apparel dedicated to enhancing visibility, including lights and colored or reflective clothing are typical. In addition, bicyclists have used their arms to signal their directional intentions, particular intentions to turn right or left. Further, the prior art discloses lighted devices which enhance the visibility of directional signals.

For example, U.S. Pat. No. 5,690,411 to Vernon L. Jackman discloses a lighted, wearable vehicular signaling system that can be used by pedestrians, runners and others to communicate directional intention. The system comprises a panel of signaling lights actuated and controlled by the user with switches. The device is powered by its own power source.

The foregoing summary of the prior art indicates that lighted directional signals have been attached to vehicles. It further indicates that wearable lighted directional signaling systems have been designed to be controlled by users. However, the prior art does not disclose a lighted signaling system that is connected to and controlled by either the electrical indicating system of a vehicle or devices on the vehicle which cause the vehicle to change direction or speed, but is also not permanently affixed to the vehicle and may be incorporated, for example, into an item of apparel that may be worn by the motorist.

An advantage of a lighted signaling system is that it enhances the visibility of vehicular indicators, like turn signals and brake lights. In particular, where the vehicle is a motorcycle, a lighted signaling system attached to an article of apparel such as a jacket and worn by a motorcyclist would be higher up than vehicular indicators attached to the frame of the motorcycle, and more visible to other motorists.

Connecting a lighted signaling system to either the electrical indicating system of the vehicle or devices on the vehicle which cause the vehicle to change direction or speed eliminates the need for a user to operate both the vehicle and the lighted signaling system. A user-controlled signaling system, such as those disclosed by the prior art, requires the user's attention to actuate and control signaling, which distracts the user from operating the vehicle and increases the risk of an accident. In contrast, the present invention is connected to and controlled by the electrical indicating system of a vehicle or devices on the vehicle which cause the vehicle to change direction or speed. Consequently, the vehicle user's input is not required to actuate or control the signaling system. The present invention is therefore safer and more reliable.

A further advantage of one embodiment of the invention wherein the wearable lighted signaling system is connected to the electrical indicating system of the vehicle is that the signaling does not require a separate power source but is powered by the electrical indicating system of the vehicle. As a consequence, the user is spared the inconvenience and expense of recharging or changing batteries to insure that the signaling system is operational at all times.

SUMMARY OF THE INVENTION

The invention provides a lighted signaling system for a user operating a vehicle having an electrical indicating system. The invention comprises an article of apparel worn by a user, one or more signaling modules connected to said apparel, light sources mounted on each signaling module and arranged in patterns, and electrical connectors which connect said light sources to the electrical indicating system of a vehicle or devices on the vehicle which cause the vehicle to change direction or speed. In one embodiment, the light sources illuminate in response to vehicular indicators received from the electrical indicating system of the vehicle. In another embodiment, light sources illuminate in response to the actuation of devices on the vehicle which cause the vehicle to change direction or speed.

In a preferred embodiment, the lighted signaling system comprises a jacket with signaling modules having a plurality of light emitting diodes arranged in patterns which signal running, right turns, left turns and braking. Signaling modules are attached to the back and elbow portions of the jacket for maximum visibility to other motorists.

DETAILED DESCRIPTION OF THE INVENTION

Figure 1:
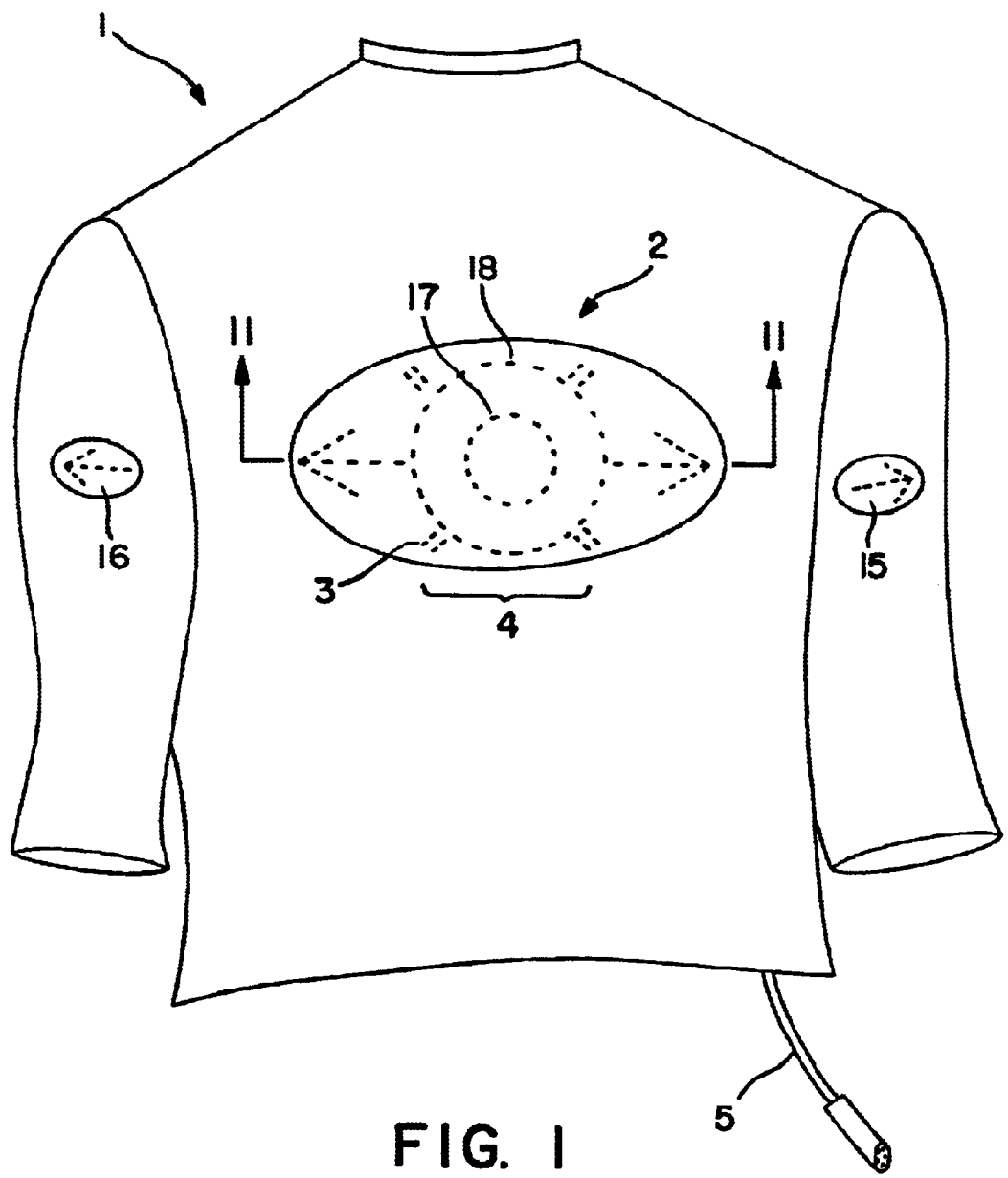
FIG. 1 is a perspective view of a preferred embodiment of a jacket with signaling modules affixed to the back and elbow portions.
Figure 2:
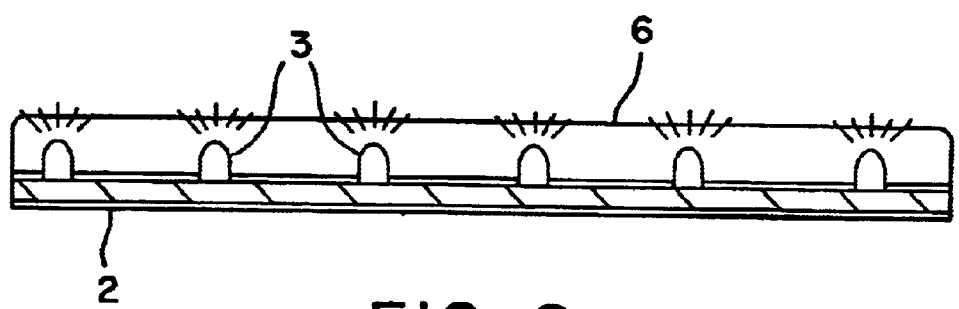
FIG. 2 is a cross-sectional view of a portion of the circuit board taken along lines II—II of FIG. 1.
Figure 3:
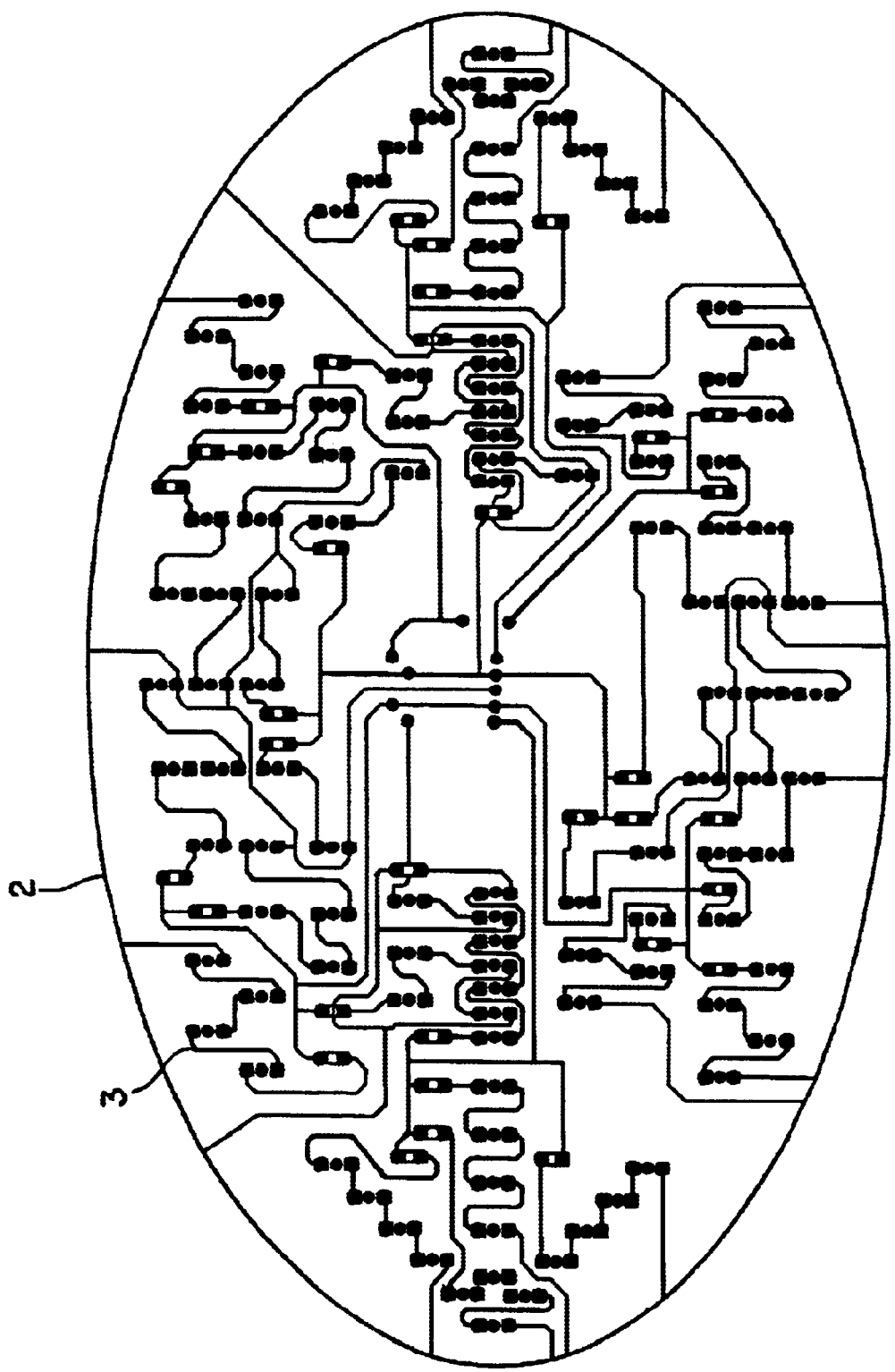
FIG. 3 is a plan view of one embodiment of a signaling module comprised of a circuit board and a plurality of light emitting diodes.

The invention provides a lighted signaling system for a user operating a vehicle having an electrical indicating system. Referring to FIGS. 1, 2 and 3, the invention comprises an article of apparel 1, one or more signaling module (s) 2 connected to said article of apparel 1, a plurality of light sources 3 mounted on each signaling module 2, said light sources 3 arranged in one or more signaling pattern(s) 4; and, electrical connectors 5 for connecting said plurality of light sources 3 to the electrical indicating system of the vehicle (not shown).

The invention is designed for use in conjunction with any vehicle having an electrical indicating system or devices on the vehicle which cause the vehicle to change direction or speed. An electrical indicating system is an electrical system which controls lighted indicators attached to a vehicle, including running, right turn, left turn and braking indicators. Devices which cause vehicles to change direction or speed include braking and steering devices. Such vehicles may include motorcycles, bicycles, snowmobiles, boats, personal watercrafts, jet skis, off-road vehicles and automobiles.

Suitable items of apparel 1 may include jackets, vests, sweaters, sweatshirts, shirts, snowsuits, lifejackets, pants, hats, belts, backpacks and other bags and any other item capable of being worn or carried. The apparel 1 also may be a chain which may be worn around a user's neck and to which a signaling module 2 may be attached. In a preferred embodiment shown in FIG. 1, the apparel 1 is a motorcycle jacket.

The invention may be manufactured with signaling modules 2 already attached to the apparel 1. Alternatively, signaling modules 2 may be manufactured and sold separately or along with some means for the user to connect them to a chosen item of apparel 1.

The signaling modules 2 may be connected to apparel 1 by any method, including gluing, sewing, tying, ironing-on or using Velcro. A signaling module 2 may comprise a region of an item of apparel 1 where light sources 3 are attached directly to the apparel 1.

Signaling modules 2 may be designed in various shapes and sizes. Possible shapes include circles, ovals, squares, rectangles and irregular shapes. The signaling modules 2 can be any size, but should be large enough to be visible and support signaling patterns 4 of light sources 3, and small enough to be worn or carried by a user.

Signaling modules 2 may be constructed of metal, plastic, wood or fabric. Signaling modules 2 should be light weight and flexible so that the invention may be easily and comfortably worn or carried. Signaling modules 2 should be durable enough to withstand normal wear and tear on apparel. In a preferred embodiment, signaling modules 2 comprise thin, flexible, circuit boards. Signaling modules 2 should be resistant to seasonal changes in temperature and rainy conditions. The signaling module 2 may have a transparent or translucent signaling module cover 6 to shield the light sources 3 and electrical connectors 5 from the elements. In a preferred embodiment, as shown in FIG. 2, the circuitry connecting the light sources 3 on the circuit board is sprayed with an acrylic coating and the signaling module 2 is enclosed by a signaling module cover 6 to make it water resistant. The signaling module cover 6 should be transparent or translucent, and may be made of PVC plastic. Advertisements, logos, names, trade names, trademarks, emblems, signs or other symbols also may be stenciled on the signaling module cover 6.

The light sources 3 may be bulbs or light emitting diodes ("L.E.Ds."). In a preferred embodiment, the light sources 3 comprise ultra-bright L.E.Ds. The light sources 3 may illuminate in a variety of colors. In a preferred embodiment, blue light sources 3 are used to signal the vehicle is running, red light sources 3 are used to signal braking and yellow light sources 3 are used to signal right and left turns.

The light sources 3 are arranged in signaling patterns 4 which may reflect vehicular indicators, including running, right turns, left turns and braking. In a preferred embodiment as shown in FIG. 1, signaling patterns 4 include a rightward pointing arrow 15 for signaling a right turn, a leftward pointing arrow 16 for signaling a left turn, a circle for signaling running 17 and a larger circle with outward protrusions 18 for signaling braking.

In addition, supplementary modules may be provided containing light sources in the form of advertisements, logos, names, trade names, trademarks, emblems, signs or other symbols. The supplementary module light sources may illuminate in response to vehicular indicators received from the electrical indicating system of the vehicle, devices on the vehicle which cause the vehicle to change direction or speed, or some other source.

The signaling modules 2 may be attached anywhere on the apparel 1, but preferably in positions where they will be readily visible to onlookers. In a preferred embodiment as shown in FIG. 1, signaling modules 2 are attached to the back and elbow regions of a jacket so that motorists behind the user can see the user's directional signals clearly.

In a preferred embodiment, the light sources 3 on the signaling module 2 are connected to the electrical indicating system of a vehicle. The electrical indicating system of a vehicle controls the illumination of vehicular signals, including running lights, rear and front brake lights, and right and left turn indicators. Light sources 3 on signaling modules 2 are connected to the electrical indicating system of a vehicle such that the electrical indicating system also controls the illumination of the light sources 3.

In a preferred embodiment, each vehicular indicator is electrically connected to a corresponding signaling pattern 4 of light sources 3 such that, for example, a right turn vehicular indicator illuminates a right turn signaling pattern 15 of light sources 3.

In another embodiment, devices on the vehicle which cause the vehicle to change direction or speed, including braking and steering devices, are electrically connected to corresponding signaling patterns 4 of light sources 3 such that, for example, actuating a braking device illuminates a braking signaling pattern 18 of light sources 3.

Figure 4:
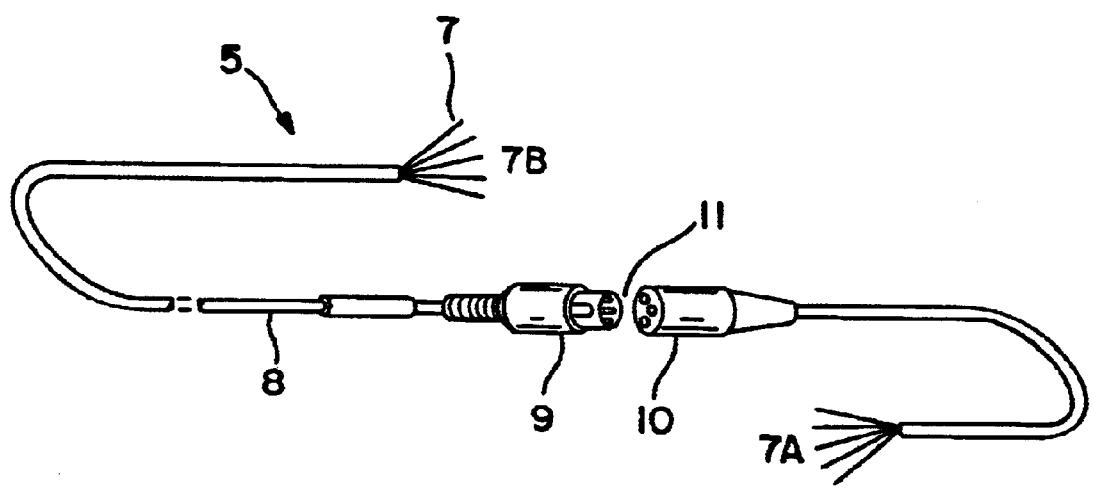
FIG. 4 is a perspective of a preferred embodiment of an electrical connector, which is a cable connected through five-prong female and male plugs.

As shown in FIG. 4, the electrical connectors 5 may comprise a plurality of wires 7, one for each signaling pattern 4 and one for circuit ground. The wires may be enclosed in a plastic encasing 8. The wires 7 may be divided into two sets of segments 7A, 7B and connected together by a male plug 9 and female plug 10, the plugs having at least as many prongs 11 as there are wires 7. The end of the first set of segments of wire 7A should be connected to the signaling module 2. The end of the second set of segments of wire 7B should be connected to the electrical indicating system of the vehicle or devices on the vehicle which cause the vehicle to change direction or speed. The plugs 9, 10 permit the signaling module to be detached when the apparel 1 is being worn but the invention is not in use. The wires may be equipped with fuses that prevent currents above safe levels.

In a preferred embodiment, the signaling modules 2 are attached to the vehicle by a coaxial cable containing at least five wires joined by small, durable five-pronged male and female plugs. The wires 7 and plastic encasing 8 should be thick and durable enough to withstand seasonal changes in temperature and rainy weather.

In an alternative embodiment, the electrical connection between the light sources 3 and the electrical indicating system of the vehicle or devices on the vehicle which cause the vehicle to change direction or speed could be wireless.

The electrical connectors 5 may be removable or retractable for storage when the apparel 1 is being worn but the invention is not in use, such as when the vehicle is parked. The apparel 1 may include a pocket for storing the electrical connectors.

What is claimed is:

1. A lighted signaling system for a user operating a vehicle having an electrical indicating system comprising:
   (i) an article of apparel for being worn on the torso of the user;
   (ii) one or more signaling module(s) connected to said article of apparel;
   (iii) a plurality of light sources mounted on each signaling module, said light sources arranged in one or more signaling pattern(s), wherein said signaling patterns comprise the following:
      a first signaling pattern indicative of a right turn, said first signaling pattern electronically connected to the electrical indicating system of the vehicle such that said first signaling pattern illuminates when the electrical indicating system indicates a right turn;
      a second signaling pattern indicative of a left turn, said second signaling pattern electronically connected to the electrical indicating system of the vehicle such that said second signaling pattern illuminates when the electrical indicating system indicates a left turn;
      a third signaling pattern indicative of braking, said third signaling pattern electronically connected to the electrical indicating system of the vehicle such that said third signaling pattern illuminates when the electrical indicating system indicates braking; and,
      a fourth signaling pattern indicative of running lights, said fourth signaling pattern electronically connected to the electrical indicating system of the vehicle such that said fourth signaling pattern illuminates when the electrical indicating system indicates the vehicle is running; and,
   (iv) an electrical connector for connecting said plurality of light sources to the electrical indicating system of the vehicle, wherein said light sources illuminate in response to vehicular indicators from the electrical indicating system of the vehicle.

2. A lighted signaling system according to claim 1 wherein said article of apparel comprises a jacket.

3. A lighted signaling system according to claim 1 wherein said signaling module comprises a circuit board.

4. A lighted signaling system according to claim 1 wherein said light sources comprise light emitting diodes mounted on each signaling module.

5. A lighted signaling system according to claim 1 further comprising supplementary modules containing light sources that illuminate in a pattern selected from the group consisting of advertisements, logos, names, trade names, trademarks, emblems, signs and symbols.

6. A lighted signaling system according to claim 1 wherein said article of apparel is a jacket and said one or more signaling module(s) are connected to said jacket as follows:
   (i) a first signaling module is connected to a right elbow portion of said jacket;
   (ii) a second signaling module is connected to a left elbow portion of said jacket; and
   (iii) a third signaling module is connected to a back portion of said jacket.

7. A lighted signaling system according to claim 6 wherein:
   (i) said one or more signaling pattern(s) of light sources mounted on said first signaling module comprise said first signaling pattern;
   (ii) said one or more signaling pattern(s) of light sources mounted on said second signaling module comprise said second signaling pattern; and
   (iii) said one or more signaling pattern(s) of light sources mounted on said third signaling module comprise said first signaling pattern, said second signaling pattern and said third signaling pattern.

8. A lighted signaling system for a user operating a motorcycle having an electrical indicating system comprising:
   (i) an article of apparel for being worn on the torso of the user;
   (ii) one or more signaling module(s) connected to said article of apparel;
   (iii) a plurality of light sources mounted on each signaling module, said light sources arranged in one or more signaling pattern(s), wherein said signaling patterns comprise the following:
      a first signaling pattern indicative of a right turn, said first signaling pattern electronically connected to the electrical indicating system of the vehicle such that said first signaling pattern illuminates when the electrical indicating system indicates a right turn;
      a second signaling pattern indicative of a left turn, said second signaling pattern electronically connected to the electrical indicating system of the vehicle such that said second signaling pattern illuminates when the electrical indicating system indicates a left turn;
      a third signaling pattern indicative of braking, said third signaling pattern electronically connected to the electrical indicating system of the vehicle such that said third signaling pattern illuminates when the electrical indicating system indicates braking; and,
      a fourth signaling pattern indicative of running lights, said fourth signaling pattern electronically connected to the electrical indicating system of the vehicle such that said fourth signaling pattern illuminates when the electrical indicating system indicates the vehicle is running; and,
   (iv) an electrical connector for connecting said plurality of light sources to the electrical indicating system of the motorcycle, wherein said light sources illuminate in response to vehicular indicators from the electrical indicating system of the motorcycle.

9. A method for signaling the vehicular indicators of a vehicle comprising providing the user with the lighted signaling system of claim 1.

* * * * *

UNITED STATES PATENT AND TRADEMARK OFFICE
CERTIFICATE OF CORRECTION

PATENT NO.    : 6,679,615 B2
DATED         : January 20, 2004
INVENTOR(S)   : Raliegh A. Spearing It is certified that error appears in the above-identified patent and that said Letters Patent is hereby corrected as shown below:

<u>Title page,</u>
Item [56], References Cited, U.S. PATENT DOCUMENTS, add:
-- US 6,558,016 B1,  Restauro,  issued 5/2003,   class 362/103
   US 6,538,567 B2,  Stewart,   issued 3/2003,   class 340/475
   US 5,128,843,    Guritz,    issued 7/1992,   class 362/103
   US 6,406,168 B1,  Whiting,   issued 6/2002,   class 362/473
   US 4,559,586,    Slarve,    issued 12/1985,  class 362/106 --

Signed and Sealed this

Thirteenth Day of April, 2004

JON W. DUDAS
*Acting Director of the United States Patent and Trademark Office*